US008997220B2

(12) United States Patent
Yu et al.

(10) Patent No.: US 8,997,220 B2
(45) Date of Patent: Mar. 31, 2015

(54) AUTOMATIC DETECTION OF SEARCH RESULTS POISONING ATTACKS

(75) Inventors: Fang Yu, Sunnyvale, CA (US); Yinglian Xie, Cupertino, CA (US); Martin Abadi, Palo Alto, CA (US); John P. John, Seattle, WA (US); Arvind Krishnamurthy, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 410 days.

(21) Appl. No.: 13/116,012

(22) Filed: May 26, 2011

(65) Prior Publication Data
US 2012/0304287 A1    Nov. 29, 2012

(51) Int. Cl.
| | | |
|---|---|---|
| *G06F 11/00* | (2006.01) | |
| *G06F 21/56* | (2013.01) | |
| *H04L 29/06* | (2006.01) | |
| *G06F 12/14* | (2006.01) | |
| *G06F 7/04* | (2006.01) | |
| *G06F 17/30* | (2006.01) | |

(52) U.S. Cl.
CPC ............ *G06F 21/56* (2013.01); *H04L 63/1408* (2013.01); *H04L 63/1466* (2013.01); *H04L 63/168* (2013.01)
USPC .................. 726/22; 726/23; 726/24; 726/25; 726/26

(58) Field of Classification Search
CPC ....... G06F 21/00; G06F 21/552; G06F 21/56; G06F 21/6281; H04L 2463/144; H04L 63/1408; H04L 43/028; H04L 63/14; H04L 63/1425; H04L 63/1458; H04L 63/1466; H04L 63/168; H04W 12/12
See application file for complete search history.

(56) References Cited

U.S. PATENT DOCUMENTS

| | | | |
|---|---|---|---|
| 7,974,998 B1* | 7/2011 | Chang ........................... | 709/201 |
| 8,131,742 B2* | 3/2012 | Stellhorn et al. .............. | 707/758 |
| 2006/0080448 A1* | 4/2006 | De Boursetty et al. ........ | 709/229 |
| 2007/0011722 A1* | 1/2007 | Hoffman et al. .................. | 726/3 |
| 2007/0078939 A1* | 4/2007 | Kallen ........................ | 709/207 |
| 2007/0198603 A1 | 8/2007 | Tsioutsiouliklis et al. | |
| 2008/0034073 A1* | 2/2008 | McCloy et al. ............... | 709/223 |

(Continued)

OTHER PUBLICATIONS

Arthur, et al., "k-means++: The Advantages of Careful Seeding", Proceedings of the Eighteenth Annual ACM-SIAM Symposium on Discrete Algorithms, SODA, Jan. 7-9, 2007, pp. 9.*

(Continued)

*Primary Examiner* — Dede Zecher
*Assistant Examiner* — Trang Doan
(74) *Attorney, Agent, or Firm* — Julie Kane Akhter; Danielle Johnston-Holmes; Micky Minhas

(57) ABSTRACT

Search result poisoning attacks may be automatically detected by identifying groups of suspicious uniform resource locators (URLs) containing multiple keywords and exhibiting patterns that deviate from other URLs in the same domain without crawling and evaluating the actual contents of each web page. Suspicious websites are identified and lexical features are extracted for each such website. The websites are clustered based on their lexical features, and group analysis is performed on each group to identify at least one suspicious group. Other implementations are directed to detecting a search engine optimization (SEO) attack by processing a large population of URLs to identify suspicious URLs based on the presence of a subset of keywords in each URL and the relative newness of each URL.

14 Claims, 3 Drawing Sheets

(56) References Cited

U.S. PATENT DOCUMENTS

| | | | |
|---|---|---|---|
| 2008/0301139 | A1 | 12/2008 | Wang et al. |
| 2009/0006532 | A1* | 1/2009 | Sinn et al. .................... 709/203 |
| 2009/0089244 | A1 | 4/2009 | Donato et al. |
| 2009/0094175 | A1* | 4/2009 | Provos et al. .................. 706/12 |
| 2009/0157675 | A1* | 6/2009 | Stellhorn et al. ................. 707/6 |
| 2009/0198673 | A1 | 8/2009 | Gao et al. |
| 2009/0254989 | A1 | 10/2009 | Achan et al. |
| 2010/0031358 | A1* | 2/2010 | Elovici et al. .................. 726/24 |
| 2011/0289582 | A1* | 11/2011 | Kejriwal et al. ................ 726/22 |
| 2011/0295982 | A1* | 12/2011 | Misra ............................ 709/220 |
| 2011/0314546 | A1* | 12/2011 | Aziz et al. ....................... 726/24 |
| 2012/0060221 | A1* | 3/2012 | Gerber et al. ................... 726/25 |
| 2012/0210431 | A1* | 8/2012 | Stahlberg et al. ............... 726/24 |
| 2012/0304244 | A1* | 11/2012 | Xie et al. .......................... 726/1 |

OTHER PUBLICATIONS

Howard, et al., "Poisoned Search Results: How Hackers Have Automated Search Engine Poisoning Attacks to Distribute Malware", SophosLabs technical paper, Poisoned search results: Automated SEO poisoning attacks to distribute malware, Mar. 2010, pp. 1-15.*

Howard, et al., "Poisoned Search Results: How Hackers Have Automated Search Engine Poisoning Attacks to Distribute Malware", Retrieved at <<http://www.sophos.com/security/technical-papers/sophos-seo-insights.pdf>>, SophosLabs technical paper, Poisoned search results: Automated SEO poisoning attacks to distribute malware, Mar. 2010, pp. 1-15.

Guan, et al., "Malicious Web Page Detection Based on Anomaly Semantics", Retrieved at <<http://jwis2009.nsysu.edu.tw/location/paper/Malicious%20Web%20Page%20Detection%20Based%20on%20Anomaly%20Semantics.pdf>>, The Fourth Joint Workshop on Information Security(JWIS), Aug. 6-7, 2009, pp. 1-12.

Perdisci, et al., "Behavioral Clustering of HTTP-Based Malware and Signature Generation Using Malicious Network Traces", Retrieved at <<http://www.gtnoise.net/papers/2010/perdisci:nsdi2010.pdf>>, Proceedings of the 7th USENIX Symposium on Networked Systems Design and Implementation, NSDI, Apr. 28-30, 2010, pp. 1-14.

Gao, et al., "Detecting and Characterizing Social Spam Campaigns", Retrieved at <<http://conferences.sigcomm.org/imc/2010/papers/p35.pdf>>, Internet Measurement Conference, Nov. 1-3, 2010, pp. 35-42.

Le, et al., "PhishDef: URL Names Say It All", Retrieved at <<http://arxiv.org/PS_cache/arxiv/pdf/1009/1009.2275v1.pdf>>, 2010, pp. 1-9.

"Alexa's Top 1 Million Web Sites", Retrieved at <<http://s3.amazonaws.com/alexa-static/top-1m.csv.zip>>, Retrieved Date: Mar. 23, 2011, pp. 32599.

Arthur, et al., "k-means++: The Advantages of Careful Seeding", Retrieved at <<http://www.stanford.edu/~darthur/kMeansPlusPlus.pdf>>, Proceedings of the Eighteenth Annual ACM-SIAM Symposium on Discrete Algorithms, SODA, Jan. 7-9, 2007, pp. 9.

"Google Ranking Factors—SEO Checklist", Retrieved at <<http://www.vaughns-1-pagers.com/internet/google-ranking-factors.htm>>, Retrieved Date: Mar. 23, 2011, pp. 14.

Castillo, et al., "Know your Neighbors: Web Spam Detection using the Web Topology", Retrieved at <<http://chato.cl/papers/cdgms_2006_know_your_neighbors.pdf>>, The 30th Annual International SIGIR Conference, Jul. 23-27, 2007, pp. 10.

Fetterly, et al., "Spam, Damn Spam, and Statistics: Using Statistical Analysis to Locate Spam Web Pages", Retrieved at <<http://webdb2004.cs.columbia.edu/papers/1-1.pdf>>, 7th International Workshop on the Web and Databases, Jun. 17-18, 2004, pp. 6.

"Search Engine Ranking Factors", Retrieved at <<http://www.seomoz.org/article/search-ranking-factors>>, Aug. 2009, pp. 6.

"How Google Works", Retrieved at <<http://www.googleguide.com/google_works.html/>>, Retrieved Date: Mar. 23, 2011, pp. 5.

"Google Search Engine Optimization Starter Guide", Retrieved at <<http://www.google.com/webmasters/docs/search-engine-optimization-starter-guide.pdf>>, Retrieved Date: Mar. 23, 2011, pp. 32.

"Google Trends", Retrieved at <<http://www.google.com/trends>>, Retrieved Date: Mar. 23, 2011, pp. 1.

"Hot Video Pages: Analysis of a Hijacked Site", Retrieved at <<http://research.zscaler.com/2010/09/hot-video-pages-analysis-of-hijacked.html>>, Sep. 20, 2010, pp. 1.

John, et al., "Searching the Searchers with Search Audit", Retrieved at <<http://www.cs.washington.edu/homes/jjohn/papers/searchaudit-jjohn-sec10.pdf>>, Usenix Security, 2010, pp. 1-16.

Ma, et al., "Beyond Blacklists: Learning to Detect Malicious Web Sites from Suspicious URLS", Retrieved at <<http://www.cs.berkeley.edu/~jtma/papers/beyondbl-kdd2009.pdf>>, The 15th ACM SIGKDD International Conference on Knowledge Discovery and Data Mining, Jun. 28-Jul. 1, 2009, pp. 9.

Ma, et al., "Identifying Suspicious URLs: An Application of Large-scale Online Learning", Retrieved at <<http://citeseerx.ist.psu.edu/viewdoc/download;jsessionid=C662F41A4DC3F5C0434AD67931C894D8?doi=10.1.1.153.3318&rep=rep1&type=pdf>>, The 26th Annual International Conference on Machine Learning held in conjunction with the 2007 International Conference on Inductive Logic Programming, Jun. 14-18, 2009, pp. 8.

Moshchuk, et al., "A Crawler-based Study of Spyware on the Web", Retrieved at <<http://citeseerx.ist.psu.edu/viewdoc/download?doi=10.1.1.104.2921&rep=rep1&type=pdf>>, Proceedings of the 13th Annual Network and Distributed Systems Security Symposium (NDSS), Feb. 2006, pp. 1-17.

Ntoulas, et al., "Detecting Spam Web Pages through Content Analysis", Retrieved at <<http://citeseerx.ist.psu.edu/viewdoc/download-?doi=10.1.1.70.897&rep=rep1&type=pdf>>, The 15th International World Wide Web Conference, May 22-26, 2006, pp. 10.

"osCommerce", Retrieved at <<http://www.oscommerce.com>>, Retrieved Date: Mar. 23, 2011, pp. 1.

"The Pagerank Citation Ranking: Bringing Order to the Web", Retrieved at <<http://citeseerx.ist.psu.edu/viewdoc/download-?doi=10.1.1.31.1768&rep=rep1&type=pdf>>, Jan. 29, 1998, pp. 1-17.

Rajab, et al., "The Nocebo Effect on the Web: an Analysis of Fake Anti-virus Distribution", Retrieved at <<http://www.usenix.org/event/leet10/tech/full_papers/Rajab.pdf>>, In proceedings of the 3rd USENIX Workshop on Large Scale Exploits and Emergent Threats (LEET), 2010, pp. 9.

"Spam SEO Trends & Statistics", Retrieved at <<http://research.zscaler.com/2010/07/spam-seo-trends-statistics-part-ii.html, Jul. 7, 2010, pp. 1.

"Twitter Trending Topics", Retrieved at <<http://twitter.com/trendingtopics>>, Retrieved Date: Mar. 23, 2011, pp. 4.

Urvoy, et al., "Tracking Web Spam with HTML Style Similarities", Retrieved at <<http://citeseerx.ist.psu.edu/viewdoc/download-?doi=10.1.1.87.5468&rep=rep1&type=pdf>>, ACM Transactions on the Web (TWEB), vol. 02, No. 1, Feb. 2008, pp. 1-26.

"Websense 2010 Threat Report", Retrieved at <<http://www.websense.corn/content/threat-report-2010-introduction.aspx>>, Retrieved Date: Mar. 23, 2011, pp. 1.

"WordPress", Retrieved at <<http://wordpress.org>>, Retrieved Date: Mar. 23, 2011, pp. 1.

Wu, et al., "Identifying Link Farm Spam Pages", Retrieved at <<http://citeseerx.ist.psu.edu/viewdoc/download?doi=10.1.1.59.1869&rep=rep1&type=pdf>>, Proceedings of the 14th international conference on World Wide Web, WWW, May 10-14, 2005, pp. 820-829.

Xie, et al., "Spamming Botnets: Signatures and Characteristics", Retrieved at <<http://ccr.sigcomm.org/drupal/files/p171-xie.pdf>>, ACM SIGCOMM 2008 Conference, Aug. 17-22, 2008, pp. 171-182.

"Yahoo! Search Content Quality Guidelines", Retrieved at <<http://help.yahoo.com/l/us/yahoo/search/basics/basics-18.html>>, Nov. 30, 2010, pp. 2.

Wang, et al., "Automated Web Patrol with Strider Honey-Monkeys Finding Web Sites That Exploit Browser Vulnerabilities", Retrieved at <<http://www.isoc.org/isoc/conferences/ndss/06/proceedings/papers/honeymonkeys.pdf>>, Proceedings of the Network and Distributed System Security Symposium, NDSS, 2006, pp. 15.

* cited by examiner

AUTOMATIC DETECTION OF SEARCH RESULTS POISONING ATTACKS

BACKGROUND

It has become common for users of computers connected to the World Wide Web (the "web") to employ web browsers and search engines to locate web pages (or "documents") having specific content of interest to them (the users). A web-based commercial search engine may index tens of billions of web documents maintained by computers all over the world. Users of the computers compose queries, and the search engine identifies documents that match the queries to the extent that such documents include keywords from the queries (known as the search results or result set) or that the documents seem otherwise relevant to the queries.

Unfortunately, in addition to valid documents on the Internet, there also exists a substantial amount of documents that contain or point to malicious software ("malware"), masquerading as useful and relevant documents. This malware is intentionally designed to cause harm to other computers or computer users (ranging in degree from minor to substantial) either directly (e.g., by harming the computer system itself) or indirectly (e.g., by spying and/or stealing information to facilitate identity theft of the computer's user). For example, recent research suggests that nearly 11,000 domains are being used to serve malware in the form of fake anti-virus software.

The proliferation of malware throughout the Internet over the past several years has been extensive. In addition to commonplace techniques for spreading malware—such as through spam email—attackers are constantly devising new and more sophisticated methods to infect user computers. One such technique is the widespread use of search engines as the medium for distributing malware. By manipulating search engine ranking algorithms using a variety of search engine optimization (SEO) techniques, attackers are able to poison search results for popular terms with seemingly relevant and harmless links to malicious web pages. By one estimate, in 2010, over half of the most popular keyword searches lead to first page results containing at least one link (if not many links) to a malicious web page.

SUMMARY

Techniques are described that automatically detect search results poisoning attacks. Several implementations identify groups of suspicious uniform resource locators (URLs) containing multiple keywords and exhibiting patterns that deviate from other URLs in the same domain without crawling and evaluating the actual contents of each web page.

Several implementations are directed to identifying suspicious websites from among a plurality of websites, extracting lexical features for each suspicious website, clustering each suspicious website into a plurality of groups based on the extracted lexical features, and performing group analysis on each group to identify at least one suspicious group. Other implementations are directed to systems for automatically identifying suspicious websites based on a change in behavior, automatically clustering suspicious websites into groups based on the lexical features of the suspicious websites, and automatically analyzing the groups based on page structure similarity of the websites comprising each such group. Yet other implementations are directed to software for detecting a search engine optimization (SEO) attack comprising instructions that process a large population of URLs to identify suspicious URLs based on the presence of a subset of keywords in each URL, a similarity in structure between each URL, and the relative newness of each URL.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings.

DETAILED DESCRIPTION

Figure 1:
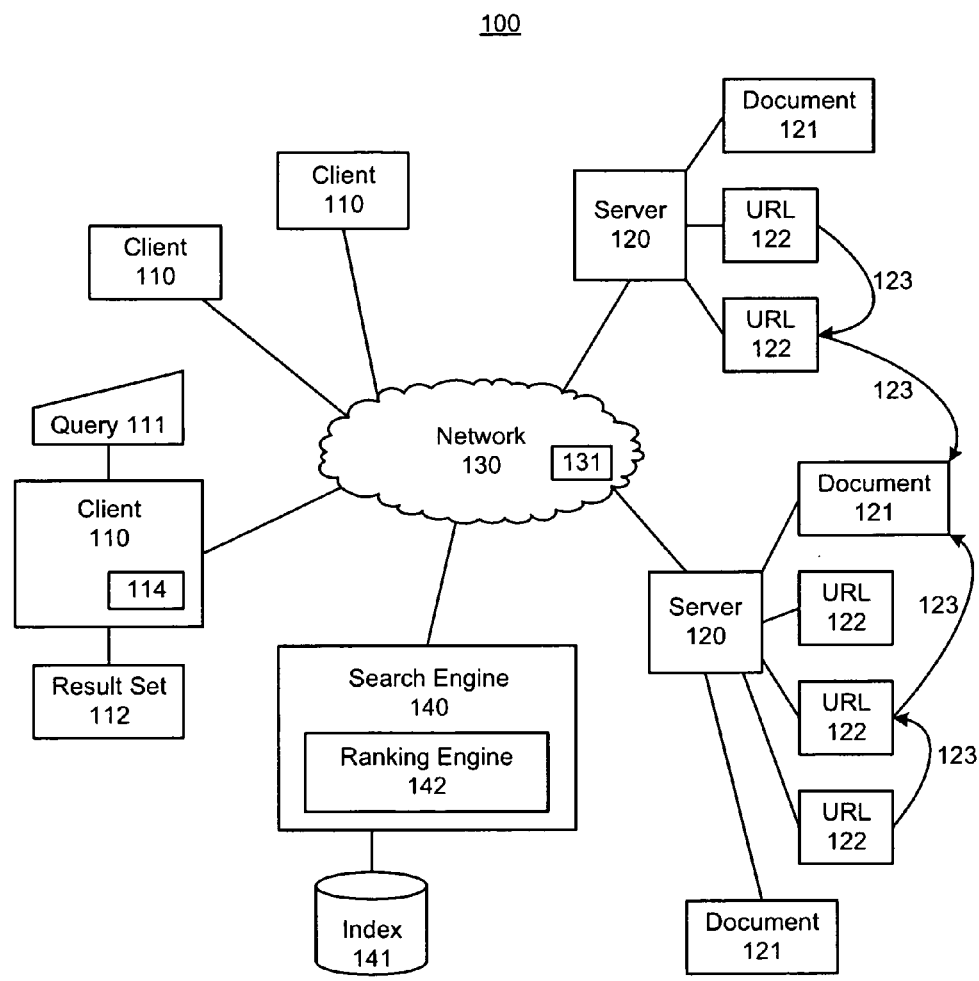
FIG. 1 is an illustration of a search engine in an exemplary network environment in which the numerous implementations disclosed herein may be utilized.

FIG. 1 is an illustration of a search engine 140 in an exemplary network environment 100 in which the numerous implementations disclosed herein may be utilized. The environment includes one or more client computers 110 and one or more server computers 120 (generally "hosts") connected to each other by a network 130, for example, the Internet, a wide area network (WAN), or a local area network (LAN). The network 130 provides access to services such as the World Wide Web (the "web") 131. An example computing device is described with respect to FIG. 4.

The web 131 allows the client computers 110 to access documents 121 containing text or multimedia and maintained and served by the server computers 120. Typically, this is done with a web browser application program 114 executing on the client computers 110. The location of each of the documents 121 may be indicated by an associated uniform resource locator (URL) 122 that is entered into the web browser application program 114 to access the document (and thus the document and the URL for that document may be used interchangeably herein without loss of generality). Many of the documents may include hyperlinks 123 to other documents 121 (with each hyperlink in the form of a URL to its corresponding document).

In order to help users locate content of interest, a search engine 140 may maintain an index 141 of documents in a memory, for example, disk storage, random access memory (RAM), or a database. In response to a query 111, the search engine 140 returns a result set 112 that contains the terms (e.g., the keywords) of the query 111. To provide a high-quality user experience, search engines order search results using a ranking function that, based on the query 111 and for each document in the search result set 112, produces a score indicating how well the document matches the query 111. The ranking process may be implemented as part of a ranking engine 142 within the search engine 140.

Search Engine Optimization (SEO) is the process of optimizing web pages to rank higher in search engine results. As such, SEO techniques can be classified into one of two categories: white-hat and black-hat. Using white-hat SEO techniques, the focus of website creation is on the end-user although the page itself is still structured so that search engine crawlers can easily navigate the site, and typically support legal and legitimate goals pertaining to commerce or public relations without deceptiveness or fraud. Black-hat SEO techniques, in contrast, attempt to manipulate the rankings using deceptive and possibly illegal techniques such as keyword stuffing (filling the page with irrelevant keywords), hidden text and links, cloaking (where the content provided to crawlers is different from the content provided to users), redirects, and link farming. Websites engaged in black-hat SEO techniques are often removed from the search engine's index when detected. To detect black-hat SEO web pages, some approaches may evaluate the content of suspect web pages while others may evaluate the link structures leading to suspect pages.

In an SEO attack (also referred to as an "search-result poisoning attack"), an attacker "poisons" popular search terms by making extensive use of them in SEO pages so that links to these pages show up in the search results for those terms. When a victim then uses a search engine to search for something using the popular terms, the search results will include links that point to servers controlled by the attackers. These servers are often legitimate web servers hosting legitimate websites, but these servers have been compromised by the attackers and unwittingly host the fake SEO pages. When the unsuspecting victim clicks on one of the links to a fake SEO page from among the search results, the victim is immediately redirected by the fake SEO page (and possibly redirected again several times) to an exploit server that displays a "scareware" page, for example, a page that looks like an anti-virus scan with large flashy warnings of multiple infections found on victim's system. The purpose of this page is to scare the user into downloading and installing the purported anti-virus software offered by the website. Alternately, the exploit servers might also try to directly compromise the victim's browser.

Sophisticated SEO attacks may leverage a very large number of compromised servers, and thus these attacks are much harder to detect. Search engines also present a particularly attractive medium for distributing malware because such attacks are relatively low cost and because search engines provide an appearance of legitimacy. Since malicious pages are typically hosted on compromised web servers, they can be utilized by the attacker for malware distribution at no cost. Moreover, since malicious web pages look relevant to search engines, these pages are indexed and presented to end users the same as other relevant pages, and users generally click on search engine results without hesitation.

Automatically detecting malicious SEO links is extremely challenging because it is prohibitively expensive to test the maliciousness of every link on the Web using content-based approaches. Even testing only those links containing keywords is difficult as malicious SEO pages may look legitimate for most requests and only deliver malicious content when certain environmental requirements are met (e.g., the use of a vulnerable browser, the redirection by search engines, or user actions like mouse movements). Indeed, without intensive reverse engineering, ascertaining the environmental settings needed to obtain malicious content on a particular page is a challenge.

To automatically detect malicious SEO links, various implementations disclosed herein may rely on the observation that successful SEO attacks have three common features: (1) successful SEO attacks automatically generate pages with relevant content; (2) successful SEO attacks target multiple popular (i.e., "trendy") search keywords to maximize coverage; and (3) successful SEO attacks form dense link structures among their black-hat SEO pages in order to boost PageRank scoring. Stated differently, attackers first automatically generate pages that look relevant to search engines, and since one page alone is not enough to trap many victims, attackers typically generate many pages to cover a wide range of popular search keywords. Then, to promote these pages to the top of the search results, attackers hijack the reputation of compromised servers and create dense link structures to boost PageRank scoring. With regard to automatic detection of SEO attacks, the first two features described above provide distinct signs or characteristics utilized by the various implementations disclosed herein.

Since SEO links are often set up on compromised web servers, these servers usually change their behavior after being compromised. For example, new links are often added to these servers once compromised, and these links have different URL structures than the older links and URLs present on the server before being compromised. In addition, since attackers control a large number of compromised servers and generate pages using scripts, their URL structures are often very similar across several compromised domains. Therefore, SEO attacks can be detected by looking for newly created pages that share the same structure on different domains, and thereby also identify a corresponding group of compromised servers controlled by the same attacker (or the same SEO campaign) across multiple servers.

Figures 2, 3:
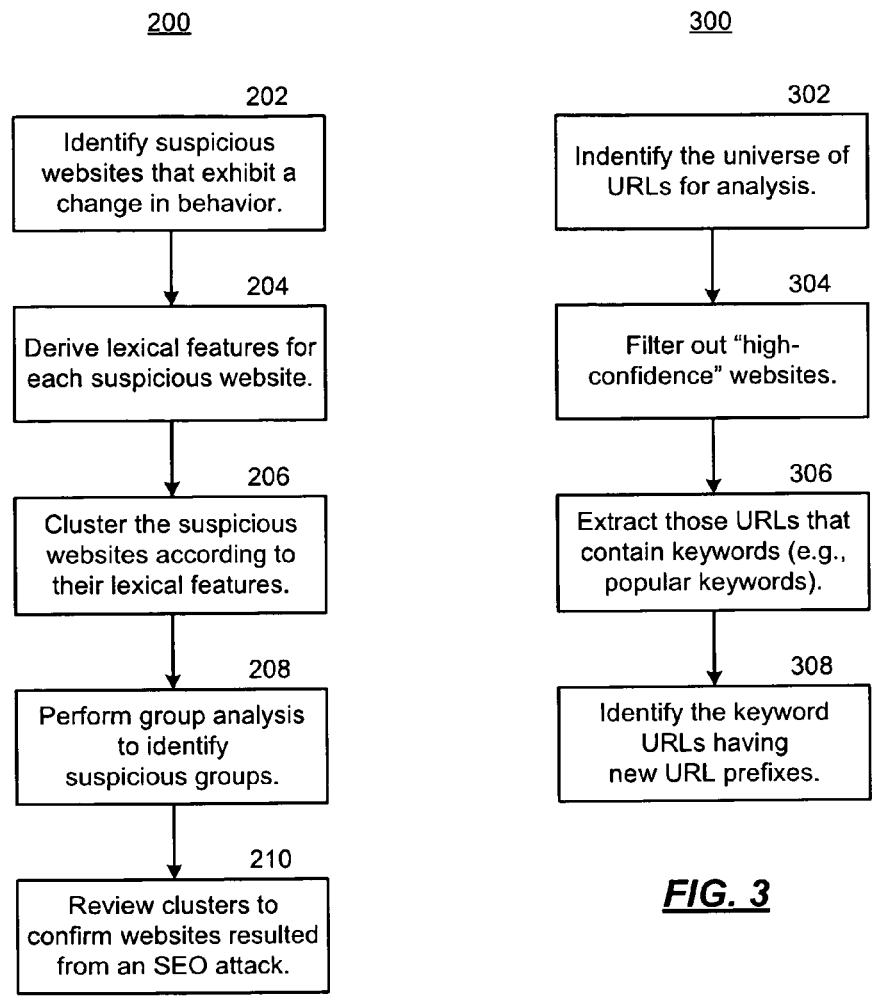
FIG. 2 is a process flow diagram of a method, representative of several implementations disclosed herein, for detecting a search result poisoning attack.
FIG. 3 is a process flow diagram of a method, representative of several implementations disclosed herein, for identifying suspicious websites that exhibit a change in behavior.

FIG. 2 is a process flow diagram of a method 200, representative of several implementations disclosed herein, for detecting an SEO attack. Referring to FIG. 2, the method begins with, at 202, identifying suspicious websites that exhibit a change in behavior (i.e., compared to each website's own history). At 204, lexical features are extracted from the URLs of the suspicious websites and, at 206, these features are used to cluster the websites into like groups. At 208, group analysis is performed on each cluster to determine suspicious clusters (a.k.a., the "suspicious groups"), and at 210 these suspicious clusters are reviewed to confirm whether they are indeed the result of a search result poisoning attack (the SEO attack).

FIG. 3 is a process flow diagram of a method 300, representative of several implementations disclosed herein, for identifying suspicious websites that exhibit a change in behavior (e.g., corresponding to 202 of FIG. 2). Referring to FIG. 3, the method comprises, at 302, identifying a universe (or large population) of URLs and, at 304, filtering out any high-confidence websites. At 306, the remaining URLs are processed to extract the subset of URLs containing keywords (e.g., popular keywords). From among this subset of URLs, at 308, URLs having new URL prefixes (compared at different points in time) are identified as corresponding to suspicious websites. The methods illustrated in FIGS. 2 and 3 are described in greater detail below.

In a search engine context, a universe of URLs (e.g., with regard to 302) may correspond to over 100 billion websites, and information on these websites is gathered and indexed by the search engine using existing means (such as webcrawlers) well-known in the art. Certain of these websites, however, are unlikely to have been compromised—constituting high-confidence websites (e.g., with regard to 304)—and thus can be excluded from the analysis at the outset (although they may be later verified once an SEO attack has been identified, as described further herein).

Since search engines take into account the presence of keywords found in a URL when computing the relevance of pages for a search request, the pages produced by an SEO attack will typically feature several keywords in the URL, and in particular these keywords may comprise a group of recent keywords (e.g., popular keywords) as tracked and reported by certain search engines. Since popular keywords will comprise more search requests than other search terms, an SEO attack would benefit from using such keywords in their fake SEO page URLs, and thus such words are extensively utilized during an SEO attack. While it is also common for legitimate websites to use links containing some popular keywords, fake URLs on compromised servers tend to make extensive use of such keywords and will be relatively new with URL structures often different from the older URLs from that domain—thus making fake SEO pages identifiable.

For example, for each URL that contains keywords (or a subset of keywords such as popular keywords), several implementations may extract (e.g., with regard to 306) the URL prefix before the keywords to identify the domain. For example, consider the following URL:

http://www.askania-fachmaerkte.de/images/ news.php?page=lisa+roberts+gillan

In this example, the keywords in the URL are "lisa," "roberts," and "gillan," and the URL prefix before the keywords is "http://www.askania-fachmaerkte.de/images/news.php?page=". Using this information, these several implementations can determine if the corresponding website had pages starting with this particular URL prefix in the past, and thus would consider the appearance of a new URL prefix as suspicious and subject to further processing (e.g., with regard to 308).

Once websites that exhibit a change in behavior have been identified—together comprising the set of "suspicious websites"—then several implementations (e.g., with regard to 206) cluster the suspicious URLs so that malicious links from the same SEO campaign will be grouped together under the assumption that they are generated by the same script. However, to accomplish this clustering, these implementations first extract the lexical features from URLs (e.g., with regard to step 204). For several implementations, one or more of the following lexical features might be selected: (a) string features, such as the separator between keywords, argument names, filenames, subdirectory names before the keywords, etc.; (b) numerical features, such as the number of arguments in the URL, the length of arguments in the URL, the length of the filename, the length of keywords, etc.; and (c) the "bag of words" comprising the keywords. Thus, for the URL from the above example, the separator between keywords is "+", the argument name is "page", the filename is "news.php", the directory before the keywords is "images", the number of arguments in the URL is one, the length of arguments is four, the length of filename is nine, and bag of words is {lisa roberts gillan}. These particular features form a kind of signature—perhaps with an acceptable degree of variation—for fake SEO pages that are the result of an SEO attack campaign.

Given that most malicious URLs created on the same domain have similar structures, certain implementations disclosed herein next aggregate these URL features together by domain names and study the similarities across domains (although sub-domains might be considered separate from each other since it is possible for a sub-domain to get compromised and not the entire domain). For string features, for example, certain implementations might aggregate them by taking the string that covers the most URLs in the domain. Similarly, for numerical features, certain implementations might take the median, and for bag of words might take the union of words. As such, in an implementation, this analysis might comprise the entirety of the lexical features derived for suspicious websites.

Using these lexical features, several implementations (e.g., with regard to 206) then cluster URLs together into groups. Certain such implementations might use a well-known K-means++ method to initially select a K centroids that are distant from each other and then apply the K-means algorithm to compute K clusters. Clusters that are tight (i.e., having low residual sum of squares within a certain threshold) are then outputted (and temporarily set aside) while, for the remaining data points, the K-means algorithm is reapplied iteratively until no more big clusters (e.g., having 10 domains or more) can be selected.

The computation of distances between data points and a cluster centroid may not be straightforward for certain features as many of the features are not numerical values, yet can be made into numerical values depending on the implementation. For example, for string features in certain implementations, it may be determined (e.g., by comparison) whether two values are identical. Similarly, the distance between two bags of words (e.g., $A=a_1, a_2, \ldots, a_n$ and $B=b_1, b_2, \ldots, b_m$) might be defined as a ratio measure of normalized union and disjunction between the words comprising each bag of words. It is contemplated that several implementations may use the same approach taken for aggregating URL features into domain features for computing centroids.

Several implementations (e.g., with regard to step 208) perform group analysis to identify the compromised domain groups and filter out the legitimate groups formed during clustering. Since SEO links in an SEO attack campaign possess similar page structures, one approach for such analysis is to quantify simple page features such as, for example, determining the number of URLs in each web page in each cluster. In operation, these implementations might sample N (e.g., 100) pages from each cluster group and then crawl these pages to extract the number of URLs per page and build a histogram from this data. The premise here is that a histogram for a legitimate group would have a diverse and varying number of links (URLs) per webpage (a relatively flat and well-distributed histogram), while a histogram for a malicious cluster group—one that has very similar pages with almost identical number of URLs per page—would express peaks around the number of links (e.g., URLs) consistently found in fake SEO pages. Therefore, it is fairly straightforward for certain such implementations to normalize each histogram and then compute peaks in the normalized histograms such that, if the histogram has unusually high peak values—which would not be expected in unrelated web pages—the group having such an unexpected peak is confirmed as suspicious.

These final groups that are confirmed as suspicious may then be manually checked and verified in certain implementations to ensure that they are indeed the result of a malware campaign and not the result of some other legitimate effort. For example, these final groups—which are expected to be relatively small in number and therefore easily manageable—might be manually checked or, in certain implementations, might have the content of such pages automatically analyzed using methodologies that were not suitable for finding the universe of URLs but are workable for confirming the validity of smaller groups of URLs.

It is also expected that, for each malicious group identified, certain implementations might also output regular expression signatures using signature generation systems known and appreciated by skilled artisans. Since URLs within a group have similar features, it is expected that most groups would only output one signature. These derived signatures could then be applied to large search engines to capture a broad set of attacks appearing in search engine results in such implementations, and the fake SEO pages stemming from these attacks could be blocked and prevented from being listed in search engine results. In other words, search engines could employ subsystems for evaluating search results using the regular expression signatures to identify malicious links and then filter out those links to protect the search engine users. These signatures could also be applied to the websites of high-confidence servers skipped early in the detection process as it is possible that even high-confidence servers may have been compromised and thereby use the signatures to perform a back-end check.

Figure 4:
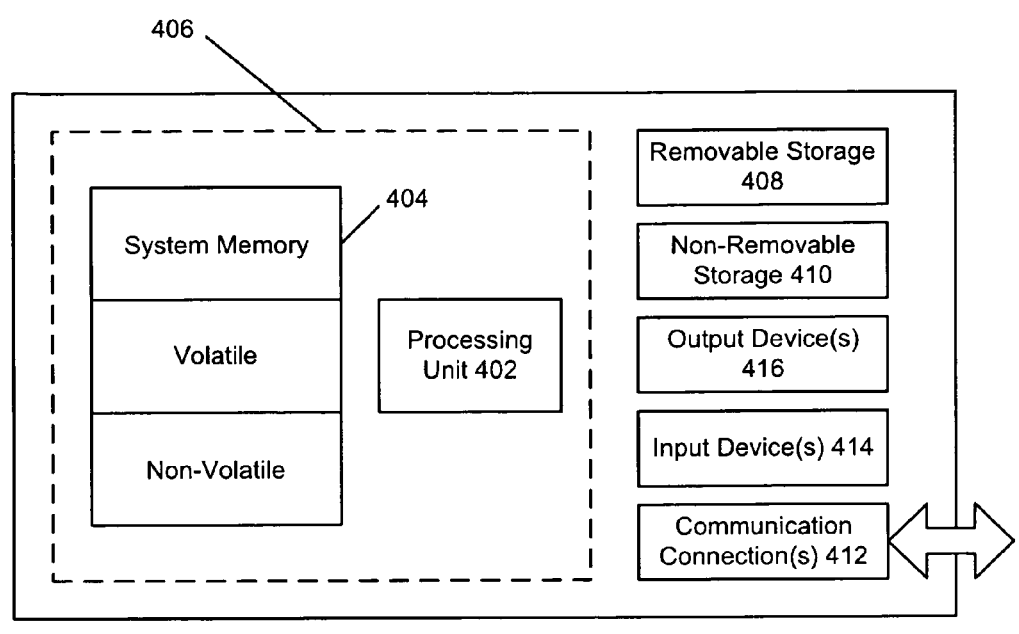
FIG. 4 shows an exemplary computing environment.

FIG. 4 shows an exemplary computing environment in which example implementations and aspects may be implemented. The computing system environment is only one example of a suitable computing environment and is not intended to suggest any limitation as to the scope of use or functionality. Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network personal computers, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing aspects described herein includes a computing device, such as computing device 400. In its most basic configuration, computing device 400 typically includes at least one processing unit 402 and memory 404. Depending on the exact configuration and type of computing device, memory 404 may be volatile (such as RAM), non-volatile (such as read-only memory (ROM), flash memory, etc.), or some combination of the two. This most basic configuration is illustrated in FIG. 4 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer readable media. Computer readable media can be any available media that can be accessed by device 400 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may contain communications connection(s) 412 that allow the device to communicate with other devices. Computing device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   identifying a plurality of suspicious websites from among a plurality of websites;
   extracting a set of lexical features for each website among from the plurality of suspicious websites;
   clustering each website from among the plurality of suspicious websites into a plurality of groups based on the set of lexical features extracted for each website;
   performing group analysis on each group from among the plurality of groups to identify at least one suspicious group that provides confirmation of at least one search engine optimization (SEO) attack; and
   using the identified at least one suspicious group to identify a corresponding group of compromised servers targeted by the SEO attack, wherein the corresponding group of compromised servers comprises a subset of servers that exhibit a change in behavior, indicative of the SEO attack.

2. The method of claim 1, further comprising reviewing the at least one suspicious group to confirm the SEO attack.

3. The method of claim 1, wherein, with regard to a uniform resource locator (URL), the change in behavior comprises at least one from among the group comprising a new URL and a new URL structure.

4. The method of claim 3, wherein the URL comprises a plurality of popular keywords.

5. The method of claim 1, wherein the set of lexical features comprises at least one feature from among the following group of features: a string feature, a numerical feature, and a bag of words feature.

6. The method of claim 1, wherein clustering is performed using a clustering method from among the group of clustering methods including K-means and K-means++.

7. The method of claim 1, wherein the group analysis identifies groups that share a similar page structure.

8. The method of claim 7, wherein the group analysis is based a histogram of the number of uniform resource locators (URLs) for each website comprising a group from among the plurality of groups.

9. The method of claim 1, wherein performing group analysis further comprises outputting, for at least one group from among the plurality of groups, a regular expression signature.

10. The method of claim 1, wherein performing group analysis further comprises outputting, for at least one group from among the plurality of groups, a regular expression signature using a signature generation system, and further comprising utilizing the regular expression signature to perform a check of at least one high-confidence website from among the subset of high-confidence websites.

11. The method of claim 1, further comprising generating at least one derived regular expression and using the derived regular expression to evaluate at least one link returned by a search engine.

12. A system comprising:
 a processing unit configured to at least execute instructions for:
  identifying suspicious websites based on a change in behavior;
  clustering suspicious websites into groups based on the lexical features of the suspicious websites;
  performing group analysis on each group to identify at least one group of suspicious websites that provides confirmation of at least one search engine optimization (SEO) attack; and
  identifying from the at least one group of suspicious websites, a group of compromised servers targeted by the SEO attack.

13. The system of claim 12, wherein the processing unit is further configured to execute instructions for:
 outputting, for at least one group, a regular expression signature using a signature generation system; and
 evaluating search results using the regular expression signature to identify malicious links.

14. The system of claim 13, wherein the processing unit is further configured to execute instructions for:
 blocking malicious links based on the regular expression signature.

* * * * *